United States Patent
Fukuhisa

(10) Patent No.: US 9,454,990 B1
(45) Date of Patent: Sep. 27, 2016

(54) SYSTEM AND METHOD OF CONDUCTING IN-PLACE WRITE OPERATIONS IN A SHINGLED MAGNETIC RECORDING (SMR) DRIVE

(71) Applicant: HGST Netherlands B.V., Amsterdam (NL)

(72) Inventor: Ryoji Fukuhisa, Tokyo (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/673,342

(22) Filed: Mar. 30, 2015

(51) Int. Cl.
*G11B 5/09* (2006.01)
*G11B 20/12* (2006.01)
*G06F 12/10* (2016.01)
*G06F 3/06* (2006.01)

(52) U.S. Cl.
CPC ......... *G11B 20/1217* (2013.01); *G06F 3/0608* (2013.01); *G06F 3/0644* (2013.01); *G06F 3/0676* (2013.01); *G06F 12/10* (2013.01); *G06F 2212/1041* (2013.01); *G06F 2212/152* (2013.01); *G06F 2212/21* (2013.01); *G06F 2212/253* (2013.01); *G06F 2212/70* (2013.01); *G11B 2020/1238* (2013.01)

(58) Field of Classification Search
None
See application file for complete search history.

(56) References Cited

U.S. PATENT DOCUMENTS

| | | | | |
|---|---|---|---|---|
| 8,559,123 | B2 | 10/2013 | Hirata et al. | |
| 8,867,153 | B1* | 10/2014 | Coker | G11B 5/012 360/31 |
| 8,922,925 | B1* | 12/2014 | Coker | G11B 20/1217 360/48 |
| 8,941,943 | B1* | 1/2015 | Coker | G11B 5/012 360/48 |
| 2012/0300325 | A1* | 11/2012 | Hall | G11B 5/012 360/15 |
| 2012/0300326 | A1 | 11/2012 | Hall | |
| 2012/0300328 | A1* | 11/2012 | Coker | G11B 5/012 360/31 |
| 2012/0303866 | A1* | 11/2012 | Bandic | G11B 5/012 711/103 |
| 2012/0303889 | A1* | 11/2012 | Coker | G11B 5/012 711/113 |
| 2012/0303930 | A1* | 11/2012 | Coker | G11B 5/012 711/207 |
| 2013/0232292 | A1 | 9/2013 | Bandic et al. | |
| 2013/0335856 | A1* | 12/2013 | Tanabe | G11B 5/596 360/76 |
| 2014/0006707 | A1* | 1/2014 | Bandic | G06F 12/08 711/113 |
| 2014/0043708 | A1 | 2/2014 | Erden et al. | |
| 2014/0055883 | A1 | 2/2014 | Dhanda et al. | |
| 2015/0160882 | A1* | 6/2015 | Coker | G06F 3/0626 711/111 |

OTHER PUBLICATIONS

Wang et al., "An optimization model for shingled disk via hybrid mapping and multiple garbage collection strategies," International Conference on Automatic Control and Artificial Intelligence (ACAI 2012), (Mar. 3-5, 2012) p. 473, 476. Abstract Only.
Lin et al., "Investigations on shingled write disk data layout management designs," University of Minnesota—Twin Cities (Aug. 2012): 1-7.

* cited by examiner

*Primary Examiner* — Tan X Dinh
(74) *Attorney, Agent, or Firm* — Shumaker & Sieffert, P.A.

(57) ABSTRACT

A system and method is described that allows random write operations regions utilizing shingled magnetic recording. The method includes receiving a request to re-write a logical block address (LBA) with new data, wherein the LBA is mapped to a physical block address (PBA) on a storage medium. The method further includes determining whether the data is eligible for a write-in place update wherein the data is written to an area of the I-region that has previously been written with shingled data tracks, wherein the eligibility determination is based on a mapping list of LBAs to PBAs. The method also includes writing the new data to the area of the I-region determined to be eligible for a write-in place update, wherein writing the new data further includes writing management information to the I-region that identifies a starting LBA of the write-in place update, and a length of the write-in place update.

14 Claims, 4 Drawing Sheets

SYSTEM AND METHOD OF CONDUCTING IN-PLACE WRITE OPERATIONS IN A SHINGLED MAGNETIC RECORDING (SMR) DRIVE

TECHNICAL FIELD

The present invention is related to storage devices and in particular to storage devices utilizing shingled magnetic recording (SMR) schemes to write data to the storage device.

BACKGROUND

Typically, a storage device includes a storage medium comprised of a plurality of data tracks. The storage capacity of the storage device is related, in part, to how wide the data tracks are and how closely they can be packed together. By decreasing the width of the data tracks and/or the spacing between adjacent data tracks, the overall capacity of the storage device can be increased.

In a perpendicular magnetic recording (PMR) system, the direction of magnetization associated with a magnetic storage medium is perpendicular to the surface of the medium. The width of data tracks written using the PMR system is determined based on the width of the write pole. By narrowing the width of the write pole, the width of the data tracks is decreased and areal density is increased. However, as write pole width continues to narrow, it becomes progressively more difficult to generate a magnetic field of sufficient strength to change the direction of magnetization of the magnetic storage medium.

One solution that has been proposed and utilized is the use of shingled data tracks in what is known as shingled magnetic recording (SMR) systems. In a SMR system, the width of the write pole remains the same, but data tracks are written sequentially with each successive data track being shingled (i.e., written to partially overlap) over the previously written data track. In this way, the data track that is partially written over is narrowed by the shingling of the next track, resulting in the desired narrow track width. This is sometimes referred to as a "write wide, read narrow" system, because the width of the write head may be substantially wider than the width of the read head.

A drawback of SMR systems, however, is the inability to re-write data once it has been shingled. Because the width of the write head is wide, re-writing a shingled track results in adjacent tracks being damaged. That is, data must be written sequentially, and a re-write of the data track requires re-writing of all shingled data tracks, not just the track that corresponds with the new data to be written.

To address this shortcoming, storage mediums utilizing SMR are divided into different types of regions, commonly referred to as an "I-region" and an "E-region". The E-region is typically much smaller than the I-region (i.e., holds much less data), and is used as a cache to store data before writing sequentially in the I-region. The E-region is typically not shingled, and therefore allows random write operations. The I-region is shingled, and therefore must be written sequentially with data from the E-region. However, this requires data to be written twice; once to the E-region or cache and then a second time from E-region to the I-region. This is a time-consuming operation which decreases the overall performance of the storage device.

A solution to this problem is to write data directly to the I-region without first going through the E-region or cache. However, this requires additional overhead to maintain because a logical block address (utilized by the host system) will not correspond with a particular physical block address on the storage device. That is, the logical block address will need to be shifted or re-mapped to different physical block addresses as data is re-written to the I-region. An indirection mapping system may be utilized to keep track of mapping between logical block addresses (LBAs) and physical block addresses (PBAs). In addition, if data is being written directly to a shingled area (e.g., I-region), a determination must be made whether the data write operation will adversely affect neighboring data tracks. This requires additional overhead to determine and keep track of whether adjacent data tracks include valid data that cannot be lost in which data cannot be re-written easily. Typically, directly writing to the shingled area or I-region (i.e., write-in place update) requires a searching review of the mapping of all LBAs to PBAs, which is a time-consuming and therefore cost prohibitive procedure. It would therefore be beneficial to provide a system that allows in-place updates of shingled data while reducing the cost or overhead associated with such updates.

SUMMARY

According to one example of the disclosure, a method is described that allows random write operations to a storage medium that utilizes shingled magnetic recording (SMR). The method includes receiving a request to re-write a logical block address (LBA) with new data, wherein the LBA is mapped to a physical block address (PBA) on a storage medium. The method further includes determining whether the data is eligible for a write-in place update wherein the data is written to an area of the I-region that has previously been written with shingled data tracks, wherein the eligibility determination is based on a mapping list of LBAs to PBAs. The method also includes writing the new data to the area of the I-region determined to be eligible for a write-in place update, wherein writing the new data further includes writing management information to the I-region that identifies a starting LBA of the write-in place update, and a length of the write-in place update.

According to another embodiment, a storage device includes a storage medium and a disk controller. The storage medium includes an E-region and an I-region, wherein the I-region is written with data according to a shingled magnetic recording (SMR) scheme. The disk controller controls read/write operations to the storage medium, and includes a mapping interface that includes one or more tables for mapping logical block addresses (LBAs) to physical block addresses (PBAs) on the storage medium. The disk controller determines whether data can be written in place in the I-region, and if written in place the disk controller adds management information to the I-region location of the write-in place update.

According to another embodiment, a method is described for randomly writing data to a storage device that includes E-regions and I-regions, wherein data written to at least the I-region is written utilizing a shingled magnetic recording scheme. The method includes receiving a request to write data to a logical block address (LBA), wherein the LBA is mapped to a physical block address (PBA) on a storage medium. A determination is made whether a previous write-in place update has been provided with respect to the requested LBA. If the requested LBA was the subject of a previous write-in place operation, then management information is retrieved from the I-region and is utilized to write data directly to the I-region as part of a write-in place update.

DETAILED DESCRIPTION

The present disclosure describes a system and method of providing write in-place capabilities to a shingled magnetic recording (SMR) drive. In particular, the present disclosure describes the inclusion of management information with the write in-place updates. This obviates the need for the mapping interface to maintain overhead of interleaving data from separate buffers for communication to a non-volatile memory (NVM) device via a bus. In particular, the disclosed system and method minimizes host system resources required to interleave data within the framework of the interface standards.

Figure 1:
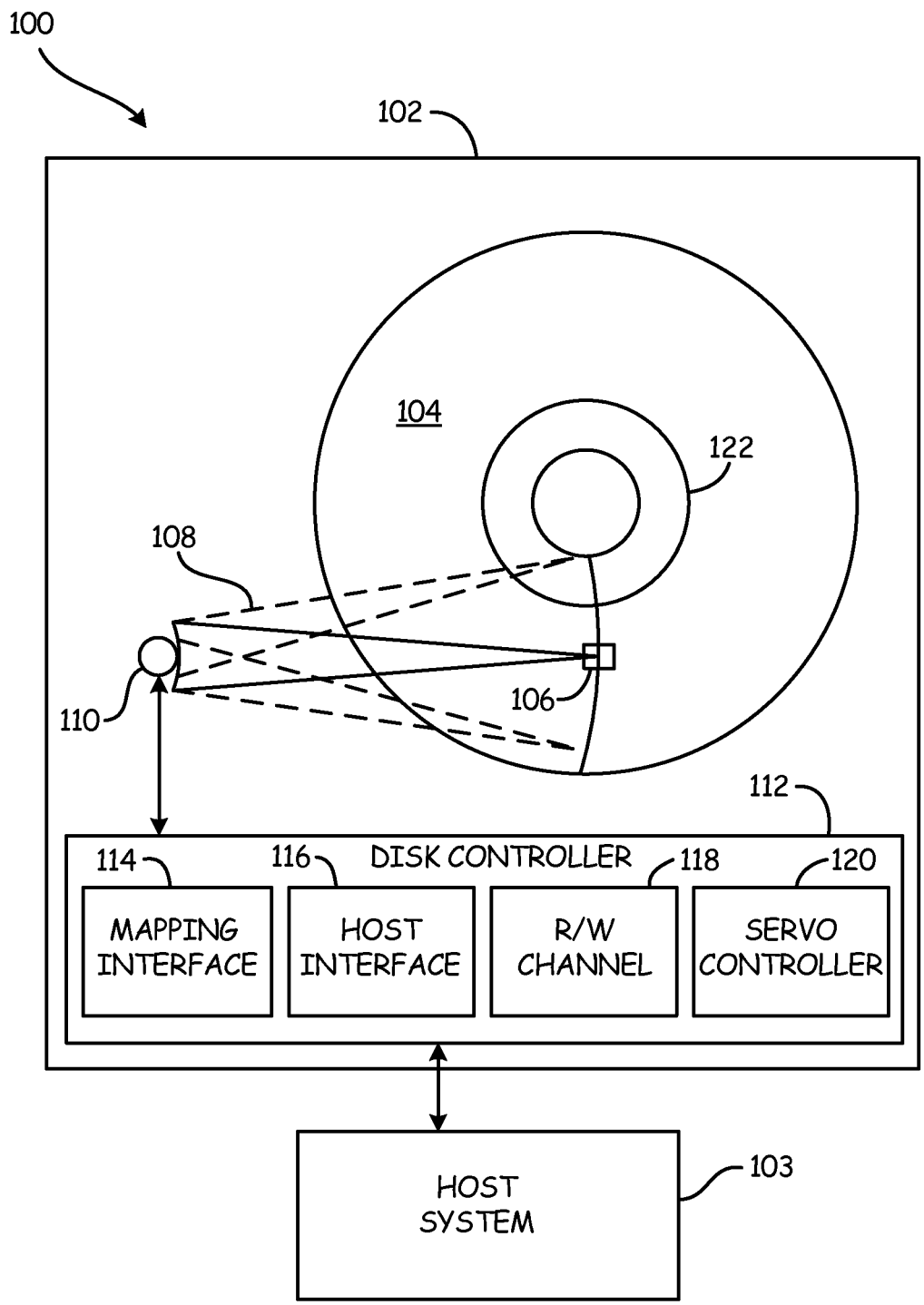
FIG. 1 is a block diagram of a data storage system according to an embodiment of the present invention.

FIG. 1 is a block diagram of system 100, which includes media storage device 102 and host system 103 according to an embodiment of the present invention. Media storage device 102 includes storage medium 104, read/write head 106, actuator arm 108, voice coil motor (VCM) 110, and disk controller 112, which includes mapping interface 114, host interface 116, read/write (R/W) controller 118, and servo controller 120.

During operation, storage medium 104 is rotated and read/write head 106 is selectively positioned by VCM 110 and actuator arm 108 between the inner diameter and outer diameter of storage medium 104 to read and/or write data to the medium. In the embodiment shown in FIG. 1, storage medium 104 is a magnetic storage medium, comprised of a plurality of concentric data tracks 122. In other embodiments, rather than concentric data tracks, storage medium 104 may be comprised of a plurality of spiraled data tracks. Although in the embodiment shown in FIG. 1, media storage device 102 is illustrated as storing all data to storage medium 104, in other embodiments media storage device, in other embodiments media storage device 102 may additionally include a solid-state storage medium in what is sometimes referred to as a hybrid disk drive.

Disk controller 112 acts as the intermediary between host system 103 and storage medium 104, and is responsible for controlling the position of read/write head 106 over a desired track, providing write signals to read/write head 106 to write data to storage medium 104, converting read signals sensed by read/write head 106 to read data for provision to host system 104, and managing the mapping between logical addresses (e.g., logical block addresses (LBAs)) utilized by host system 103 and physical addresses (e.g. physical block addresses (PBAs) that define where on the surface of storage medium 104 data is stored or will be stored. Mapping interface 114—as discussed in more detail below—is responsible for managing the mapping between LBAs and PBAs. In some systems, this may include a direct mapping system in which each LBA is mapped to a specific PBA. To provide more flexibility, however, mapping interface 114 may utilize an indirection mapping system in which LBAs are dynamically mapped to PBAs. Host interface 116 is responsible for encoding/decoding communications with host system 103. R/W controller 118 is responsible for encoding/decoding information written to and read from storage medium 104, while servo controller 120 is responsible for providing control instructions to VCM 110 to selectively position read/write head 106 over a desired track.

As discussed in more detail below, data can be written to storage medium 104 using a variety of methods, including perpendicular magnetic recording (PMR) and shingled magnetic recording (SMR), among others. In some embodiments, some areas of storage medium 104 are written utilizing one recording method (e.g., PMR), while other areas are written using a different recording method (e.g., SMR). In particular, SMR has gained in popularity because it allows data tracks to be more densely packed together than traditional recording methods. The idea behind SMR writing is that each written track intentionally overlaps a portion of a previously written track, in effect narrowing the width of the previously written track. In this way, by narrowing the width of each data track, additional data can be written to the storage medium 104.

A negative by-product of this type of writing scheme is that a data track—once written—cannot be re-written without unintentionally re-writing surrounding tracks. Thus, a shingled magnetic recording scheme does not allow write-in place updates. Indirection systems implemented by mapping interface 114 have been utilized in the past to keep track of dynamically mapping between LBAs and PBAs, but there are practical limits to the amount of maintenance that can be provided by mapping interface 114. The present invention overcomes these limitations by including management information with data written to storage medium 104. The management information is utilized to determine whether data can be written directly to the shingled data region (e.g. I-region) without requiring a costly review of the LBA-to-PBA mapping table stored by mapping interface 114.

Figure 2:
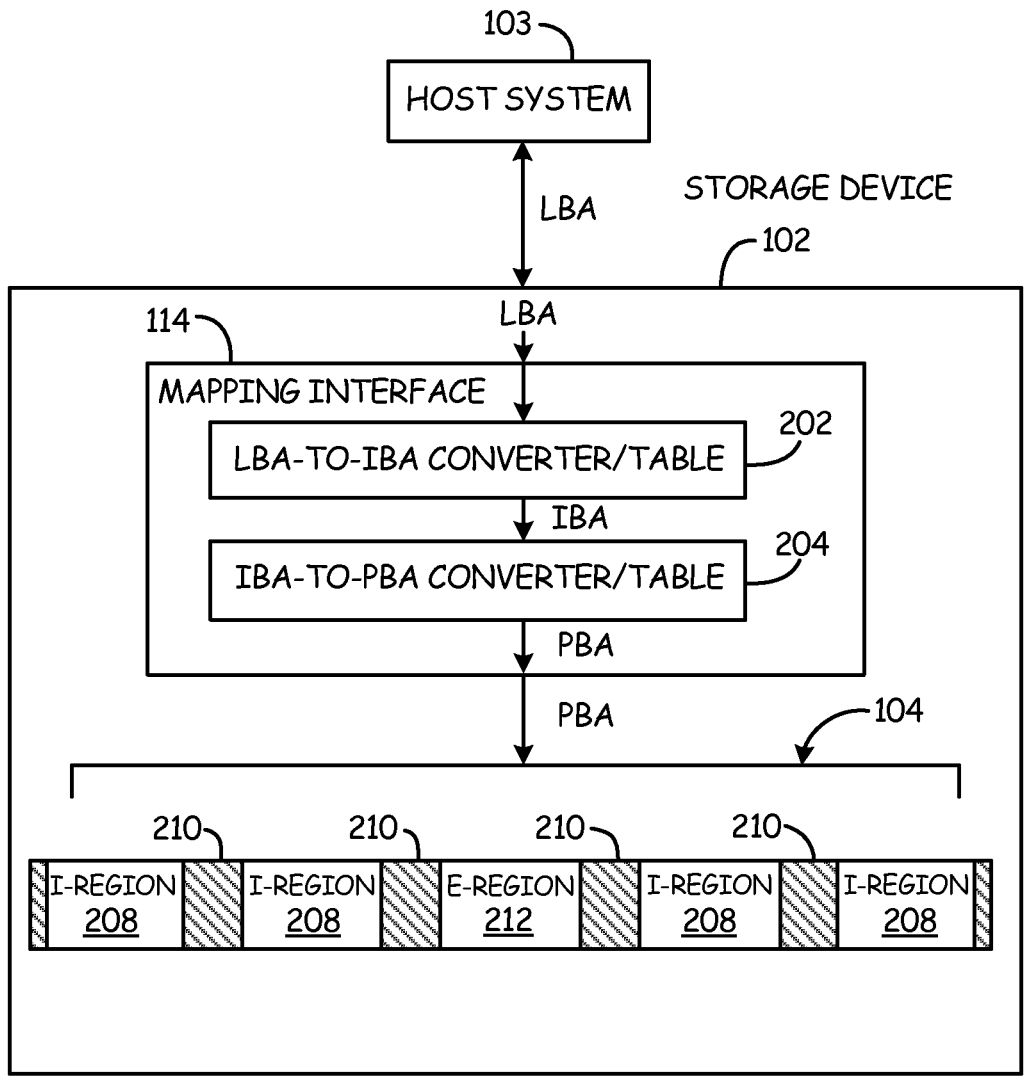
FIG. 2 is a block diagram illustrating in more detail the mapping interface between the host and the storage medium according to an embodiment of the present invention.

FIG. 2 is a block diagram illustrating in more detail the mapping interface between the host and the storage medium according to an embodiment of the present invention. In the embodiment shown in FIG. 2, host system 103 provides a logical block address (LBA) to mapping interface 114, which is converted by LBA-IBA converter 202 to an indirect block address (IBA), which is in turn converted by IBA-PBA converter 204 to a physical block address (PBA).

Storage medium 104 is divided into a plurality of different regions, including a plurality of I-regions 208, a plurality of guard regions 210, and a plurality of E-regions 212, wherein plurality includes one or more. E-regions 212 are typically used as staging areas where data is written—with or without shingling—prior to shingled writing of the data in one of the I-regions. In some embodiments, in addition to an E-region, storage medium may also include a cache region for initial or short-term storage of data. Traditionally, data is written to one of the plurality of E-regions 212, and then subsequently written sequentially to I-regions 208. In addition, updates to data already transferred to one of the plurality of I-regions 208 may be written to one of the plurality of E-regions. When enough data associated with I-region 208 has been updated, a defragmenting-type operation is performed to re-shingle only valid data in one of the plurality of I-regions. However, this requires data to be written twice; once to the E-region and then again to the I-region.

To avoid re-writing data, the present invention provides for in-place updates directly to the I-region. One of the conditions of an in-placed update to a region utilizing SMR, is that it cannot destroy valid data stored on adjacent data tracks as a result of the shingling operation. As discussed in more detail with respect to FIGS. 3 and 4, the present invention utilizes two mechanisms for determining whether an in-place update is appropriate. The first is a search of the mapping tables maintained by LBA-IBA converter/table 202 and/or IBA-PBA converter/table 204 to determine whether data tracks in the region surrounding a desired write-in place update contains valid data. If the search of the mappings table or tables determines that a location within I-region 208 is appropriate for a write-in place update, then the data can be written directly to the I-region without first requiring a write to E-region 212. In addition, the present invention writes management information to the location of the write-in place update that describes the precise location and amount of space available for a write-in place update. In this way, subsequent write-in place attempts to this region can rely on the management information stored to the I-region, and will not require a full search of the LBA to PBA mapping tables (as provided by LBA-IBA converter/table 202 and IBA-PBA converter/table 204).

Figure 3:
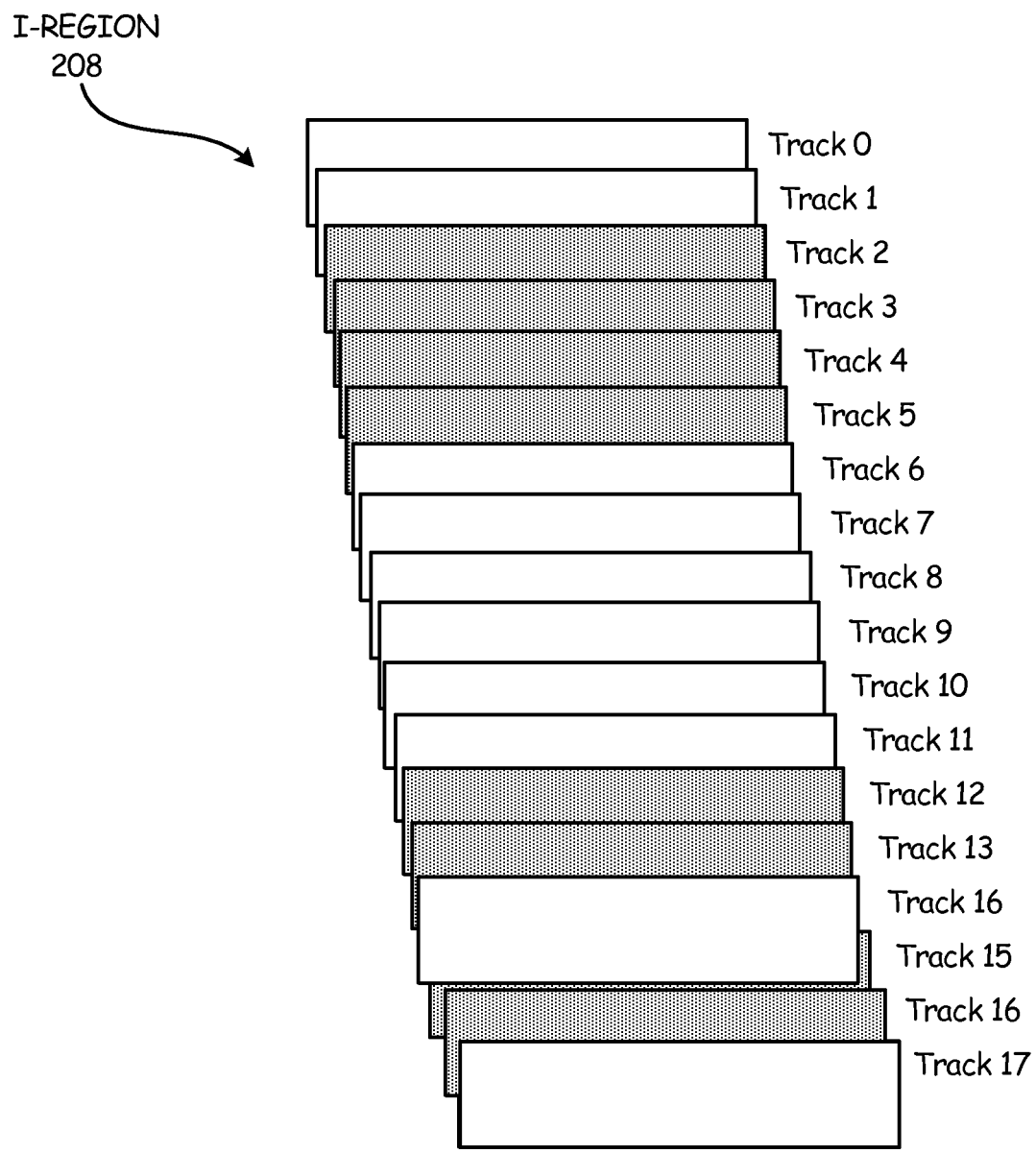
FIG. 3 is a simplified view of a plurality of shingled data tracks that illustrates a write in-place operation.

FIG. 3 is a simplified view of a plurality of shingled data tracks that illustrates a write in-place operation according to an embodiment of the present invention. Data tracks T0-T17 are shingled data tracks, written within one of the plurality of I-regions 208 (as shown in FIG. 2). Shaded data tracks (e.g., tracks T0-T1, T6-T11, T16 and T17) represent valid data tracks or data tracks that have not been re-written to another location on storage medium 104—such as E-region 212. Non-shaded data tracks (e.g., tracks T2-T5, T12-T13, and T15-T16) represent data tracks whose data is no longer valid because new or updated data has been written to E-region 212. As illustrated, adjacent data tracks at least partially overlap previously written data tracks. For example, data track T1 partially overlaps data track T0 as part of a shingling operation that narrows the width of data track T0. Likewise, writing data track T2 partially overlaps the previously written data track T1. As a result, it is not possible to re-write data to data track T0 without damaging data stored to data track T1.

Given the status of the data tracks illustrated in FIG. 3, a write-in place update can be made with respect to some of the data tracks. For example, a write-in place update has already been conducted with respect to track T16, which is written with new data over previously written track T14 as part of a write-in place operation. In this case, tracks T12-T15, as well as original data track T16 (unshaded) no longer included valid data, so re-writing track T16 (shaded version) as part of a write-in place operation does not result in a loss of any valid data. In addition, a write-in place update may be conducted starting with track T6 through track T13 because the data track both before and after a target LBA is no longer valid (e.g., has been written to E-region 212). For example, data tracks T2-T5 no longer contain valid data because updated information has been written to cache region 212 or E-region 214. Similarly, data tracks T12-T13 no longer contain valid data. As a result, data tracks T6-T11 are candidates for write-in place updates because writing new data to these tracks will not result in a loss of valid data associated with tracks T2-T5 or track T12-T13. However, determining whether particular LBAs are eligible for write-in place updates requires confirmation that adjacent data tracks are not occupied with valid data via review of the entire LBA-to-PBA mapping tables, described with respect to FIG. 2, which is a time-consuming and therefore costly process.

As discussed above, to mitigate the cost associated with determining whether a write-in place update may be utilized, the present invention includes management information at the location of the write-in place update in the I-region. For example, management information may include the starting LBA and/or starting IBA addresses associated with the write-in place update, the number of tracks utilized by the write-in place update (i.e., length), and the amount of tracks available to be utilized by subsequent write-in place updates (i.e., committed length).

A benefit of adding management information directly to the I-region location of the write-in place updates is that this information can be utilized during subsequent write-in place updates and/or during defragmenting operations rather than relying on a review of the entire LBA mapping table for a definition of the location and boundaries of the write-in place update. For example, with respect to FIG. 3, a review of the entire LBA-to-PBA mapping table confirms that data tracks T6-T11 are eligible for a write-in place update between data tracks T2 and T13. Having conducted a write-in place update of these data tracks, a subsequent write-in place operation associated with these data tracks would require a search of the entire LBA-to-PBA mapping interface to determine whether the data tracks are eligible for a write-in place update. This is because, without management information, the mapping interface can only determine whether a set of data tracks is write-in place eligible based on mapping of data to surrounding data tracks. By adding management information such as the starting LBA associated with the write-in place update and length of available space of a write-in place update, there is no need to conduct a search of the entire mapping interface table to determine whether adjacent data tracks will be harmed by the write-in place update. Rather, the stored management information provides details of the data stored to the write-in place update region as well as the size of the region. In the case of a subsequent write-in place update to the same LBA and having a length the same as or less than a previous length of the write-in place update, the subsequent write-in place update is allowed and the management information is updated to reflect any changes to the write-in place update. In another embodiment, a first write operation is written to a first logical block address (e.g., 0x1000-0x1FFF), and associated management information is updated to reflect the information (i.e., StartLBA+Length). A subsequent write operation to LBA 0x2000-0x2FFF can utilize the management information previously stored to determine that the subsequent write operation starts at the end of the previous write operation, and therefore the subsequent write operation can be written-in place to the I-region, in effect extending the range of the first LBA.

A benefit of this approach is that the mapping interface does not need to keep track of or store management information related to write-in place updates. However, in one embodiment mapping interface will store a marker or flag indicating that a write-in place update has been conducted for a LBA or range of LBAs. In this way, in response to a subsequent write request, mapping interface determines based on the marker or flag whether a previous write in place update has been conducted at the requested LBA. If a write-in place update has been conducted at the requested LBA, then management information is retrieved from the I-region and utilized to determine whether a subsequent write-in place update is appropriate. If no marker or flag is set indicating that a write-in place update was previously conducted with respect to the requested LBA, then a determination is made regarding whether a write-in place update is appropriate based on a search of LBA to PBA mapping tables.

Figure 4:
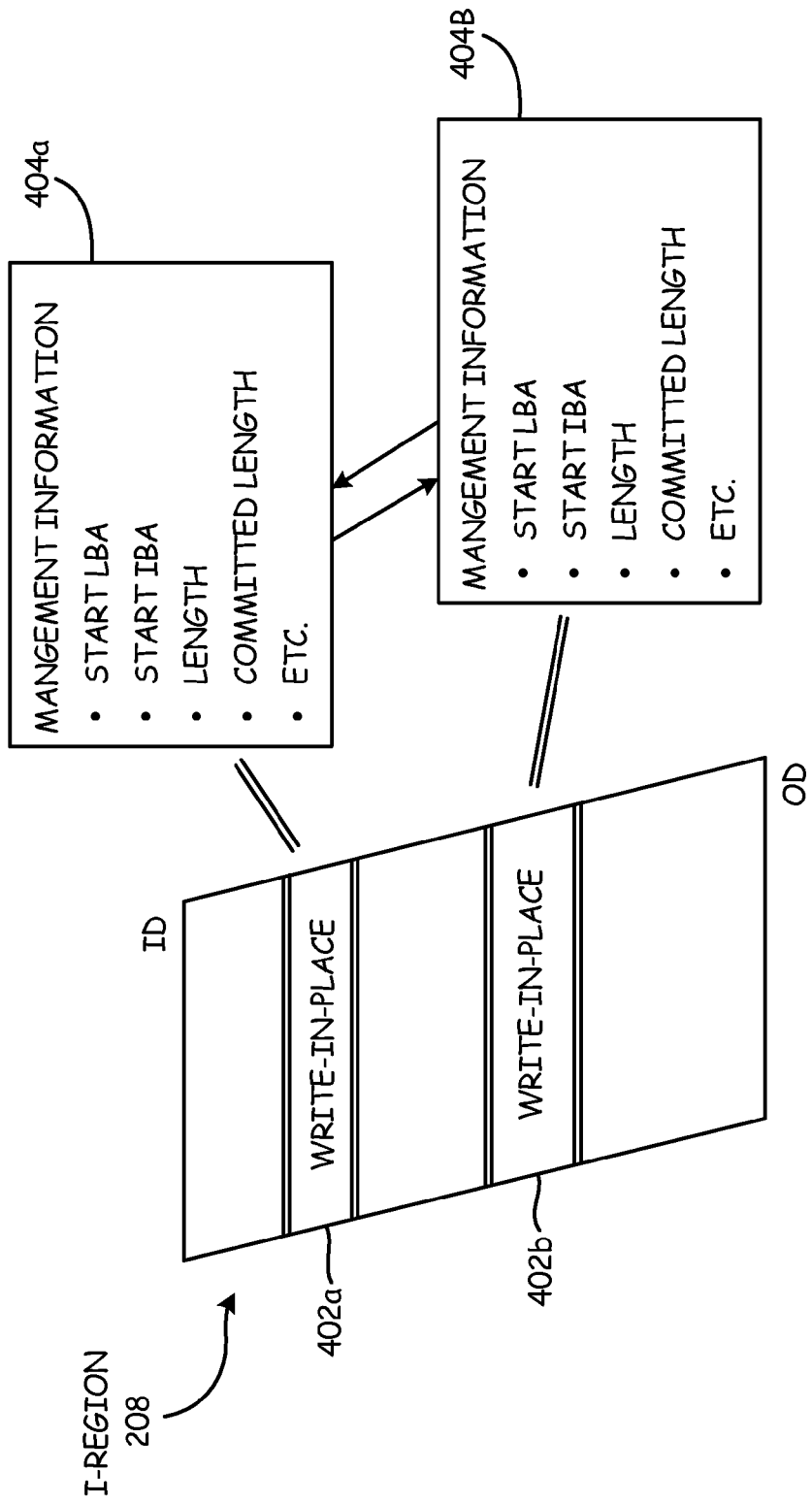
FIG. 4 is a simplified view of an I-region that illustrates a plurality of write in-place updates and corresponding management information provided according to an embodiment of the present invention.

FIG. 4 is a simplified view of an I-region that illustrates a plurality of write in-place updates 402a and 402b and corresponding management information 404a and 404b, respectively, provided according to an embodiment of the present invention. As described with respect to FIG. 3, the write-in place update is not required to begin at an inner diameter (ID) and end at an outer diameter (OD), or vice versa. Rather, the write-in place update (e.g., write-in place update 402a or 402b) may be conducted at any point within I-region 208 that meets the required criteria to prevent erasure of valid data. In addition to the data associated with the write-in place update itself, management information 404a, 404b is also included with the respective write-in place update. In the embodiment shown in FIG. 4, management information includes the starting address of the LBA assigned to the write-in place update 'StartLBA', the starting address of the IBA assigned to the write-in place update 'StartIBA', the length of the write-in place update 'Length', the available length of the write-in place update 'CommittedLength', as well as any other information required to determine the location and length of the write-in place update. In the embodiment shown in FIG. 4, first and second write-in place updates 402a and 402b have been created in I-region 208. In other embodiments, any number of write-in place updates may be utilized within an I-region, so long as the condition are met for ensuring that no data is lost in creation of a write-in place update.

Having created first and second write-in place updates 402a and 402b in I-region 208, as shown in FIG. 4, management information 404a and 404b associated with each write-in place update can subsequently be utilized during updating of either write-in place update locations without requiring a review of all LBA mapping interfaces. For example, having created first write-in place update 402a, which requires validating that data tracks both prior to and subsequent to the selected write-in place location do not contain valid data that will be destroyed by the write-in place update, management information 404a stored along with the data can be utilized to determine whether a subsequent write operation can utilize the write-in place update location. A benefit of this approach is that it does not require a subsequent determination, via traversal of the LBA mapping table, to determine whether a write-in place update is allowed. Rather, management information 404a associated with write-in place update 402a is utilized to make that determination. As a result, a substantial amount of time is saved when conducting subsequent write-in place updates.

The management information stored to the I-region is also utilized during defragmenting operations. In particular, it provides information necessary regarding the length of valid data associated with the write-in place update location.

The present invention therefore provides a system and method of providing random write operations in a drive that utilizes, in at least one location, shingled magnetic recording (SMR) techniques that would otherwise prevent random write operations. The present invention utilizes conditions to determine whether a write-in place update in a selected area of the I-region, and if so, adds management information to the location within the I-region to simplify subsequent write operations to locations within the write-in place update location.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of randomly writing data to a storage device that includes E-regions and I-regions, wherein data written to at least the I-region is written utilizing a shingled magnetic recording scheme, the method comprising:
   receiving a request to write data to a logical block address (LBA), wherein the LBA is mapped to a physical block address (PBA) on a storage medium of the storage device;
   determining whether the data is eligible for a write-in place update to an area of the I-region, wherein initial eligibility of write-in place updates is based on a mapping list of LBAs to PBAs; and
   writing the data to the area of the I-region determined to be eligible for a write-in place update, wherein writing the data further includes writing management information to the I-region that identifies a starting LBA of the write-in place update and a length of the write-in place update.

2. The method of claim 1, wherein determining whether the data is eligible for the write-in place update includes determining whether data before and after the LBA in the I-region has been written to an E-region of the E-regions.

3. The method of claim 1, further including:
   receiving a subsequent request to re-write the LBA with new data;
   determining whether a write-in place update was previously provided with respect to the LBA;
   retrieving management information from the I-region associated with the LBA; and
   determining, based on the management information, whether the new data is eligible for a write-in place update to the area of the I-region.

4. The method of claim 3, wherein determining, based on the management information written to the I-region, whether the new data is eligible for a write-in place update to the area of the I-region includes determining whether the length of data to be written to the area is equal to or less than a length associated with the area as provided by the management information.

5. The method of claim 3, further including:
   updating the management information associated with the LBA; and
   writing the new data and the updated management information to the I-region as part of the write-in place update.

6. The method of claim 1, wherein the LBA is a first LBA and the area is a first area, further including:
   receiving a subsequent request to write subsequent data to a second logical block address (LBA), wherein the second LBA is sequential to the first LBA;
   determining whether the data is eligible for a write-in place update to a second area of the I-region, wherein eligibility is determined based on management information written to the I-region that identifies a starting LBA of the write-in place update, and a length of the write-in place update associated with the first LBA; and
extending the range of the initial write-in place update to include the subsequent data by updating management information associated with the write-in place update and updating the management information to reflect the change in range of the write-in place update.

7. A storage device comprising:
a storage medium that includes an E-region and an I-region, wherein the I-region is written with data according to a shingled magnetic recording (SMR) scheme; and
a disk controller configured to:
   receive a request to write data to a logical block address (LBA), wherein the disk controller includes a mapping interface that includes a table that maps LBAs to physical block addresses (PBAs) on the storage medium;
   determine whether the data is eligible for an initial write-in place update to an area of the I-region based on the table that maps LBAs to PBAs;
   in response to determining that data can be written in place in the I-region, add management information to the data, wherein the management information includes a starting LBA and a length of the write-in place update; and
   write the data including the management information to the area of the storage medium mapped to the LBA.

8. The storage device of claim 7, wherein the disk controller is further configured to determine whether subsequent write-in place updates can be conducted in an area of the I-region based on the management information stored at the location of the write-in place update.

9. The storage device of claim 8, wherein the management information includes a starting LBA address and a length of the write-in place update.

10. The storage device of claim 7, wherein the management information is updated each time new data is written to the write-in place update.

11. A method of randomly writing data to a storage device that includes E-regions and I-regions, wherein data written to at least the I-region is written utilizing a shingled magnetic recording scheme, the method comprising:
   receiving a request to write data to a logical block address (LBA), wherein the LBA is mapped to a physical block address (PBA) on a storage medium of the storage device;
   determining whether a previous write-in place update has been provided with respect to the requested LBA;
   retrieving management information from the I-region if the requested LBA was the subject of a previous write-in place operation; and
   utilizing the management information to write the data directly to the I-region as part of a write-in place update based on the management information.

12. The method of claim 11, further including:
   determining whether the requested LBA is eligible for a write-in place update by reviewing a LBA to PBA mapping table if no previous write-in place update has been provided at the requested LBA.

13. The method of claim 12, further including:
   writing the data to the area of the I-region determined to be eligible for a write-in place update, wherein writing the data further includes writing management information to the I-region that identifies a starting LBA of the write-in place update, and a length of the write-in place update.

14. The method of claim 11, wherein the management information includes a starting LBA address and a length of the write-in place update.

* * * * *